United States Patent
Stephens et al.

(10) Patent No.: US 7,245,203 B2
(45) Date of Patent: Jul. 17, 2007

(54) INDICATOR APPARATUS AND METHOD FOR A VEHICLE USING SIDE-EMITTING LIGHT-EMITTING DIODE

(75) Inventors: Newel Lloyd Stephens, Madison, IN (US); Kevin Scott Williams, Hanover, IN (US)

(73) Assignee: Grote Industries, Inc., Madison, IN (US)

( * ) Notice: Subject to any disclaimer, the term of this patent is extended or adjusted under 35 U.S.C. 154(b) by 192 days.

(21) Appl. No.: 11/064,395

(22) Filed: Feb. 23, 2005

(65) Prior Publication Data

US 2005/0231334 A1 Oct. 20, 2005

Related U.S. Application Data

(63) Continuation-in-part of application No. 10/815,595, filed on Apr. 1, 2004, now abandoned.

(51) Int. Cl.
*B60Q 1/00* (2006.01)
(52) U.S. Cl. .............. 340/425.5; 340/815.45; 362/485; 362/247; 362/245
(58) Field of Classification Search ........... 340/815.45, 340/42, 5.5; 362/247, 240, 545, 498, 485, 362/496
See application file for complete search history.

(56) References Cited

U.S. PATENT DOCUMENTS

| | | | |
|---|---|---|---|
| 5,966,073 A * | 10/1999 | Walton | 340/479 |
| 6,095,663 A * | 8/2000 | Pond et al. | 362/247 |
| 6,234,646 B1 | 5/2001 | Ito | |
| D445,924 S | 7/2001 | Oh | |
| 6,276,822 B1 | 8/2001 | Bedrosian et al. | |
| D447,826 S | 9/2001 | Kang | |
| D451,218 S | 11/2001 | Bernier | |
| 6,357,902 B1 | 3/2002 | Horowitz | |
| 6,371,636 B1 | 4/2002 | Wesson | |
| 6,447,155 B2 | 9/2002 | Kondo et al. | |
| 6,547,410 B1 | 4/2003 | Pederson | |
| 6,558,032 B2 | 5/2003 | Kondo et al. | |
| 6,590,502 B1 | 7/2003 | Pederson | |
| 6,601,983 B1 | 8/2003 | Runfola et al. | |
| 6,811,287 B2 * | 11/2004 | Roller et al. | 362/336 |
| 7,021,801 B2 * | 4/2006 | Mohacsi | 362/477 |
| 7,055,996 B2 * | 6/2006 | Pond et al. | 362/498 |
| 2003/0189832 A1 * | 10/2003 | Rizkin et al. | 362/302 |
| 2005/0122727 A1 * | 6/2005 | Machi et al. | 362/470 |
| 2005/0201112 A1 * | 9/2005 | Machi et al. | 362/470 |

\* cited by examiner

*Primary Examiner*—Jeffery Hofsass
*Assistant Examiner*—Hoi C. Lau
(74) *Attorney, Agent, or Firm*—Woodard, Emhardt, Moriarty, McNett & Henry LLP

(57) ABSTRACT

An indicator is provided that utilizes a side-emitting light-emitting diode to indicate the state of a vehicle. An example vehicle indicator is an automobile turn indicator. Other embodiments and features further provide for a conventional light-emitting diode additionally mounted to the vehicle indicator. Certain embodiments provide a cover that protects the vehicle indicator from damage and influences the pattern and/or frequency of light emanating from the vehicle indicator. Yet other embodiments provide a circuit board for converting power from the vehicle's power source to the particular power requirements, a timing mechanism for controlling illumination, and a heat dissipating apparatus for controlling the temperature of the side-emitting light-emitting diode. Still other embodiments provide an indicator that directs light toward the vehicle operator.

35 Claims, 7 Drawing Sheets

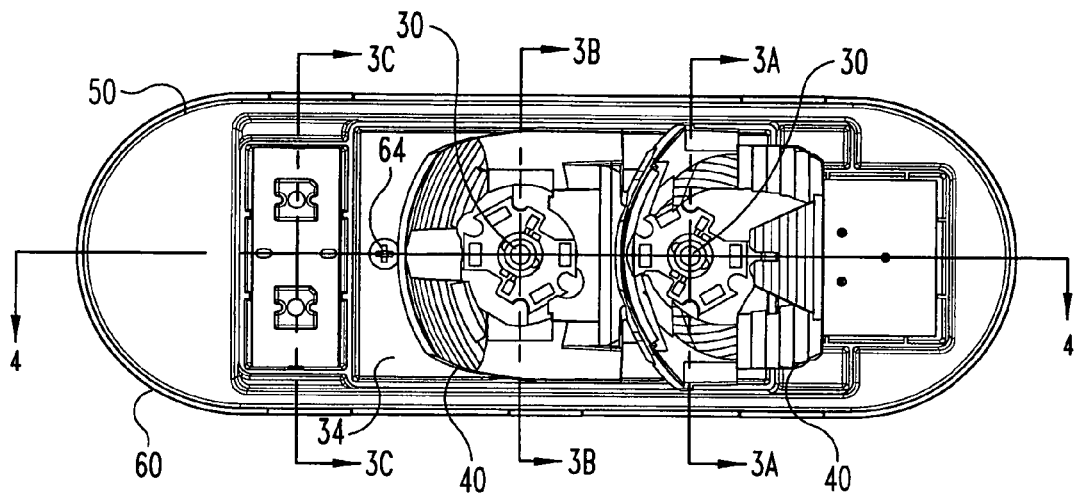
Fig. 2
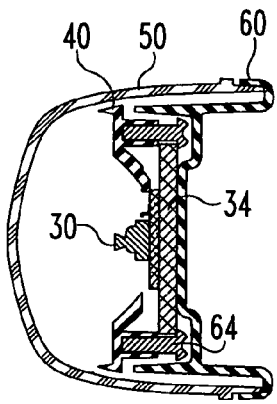 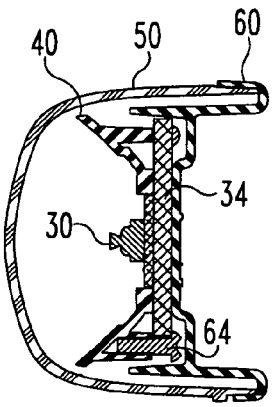 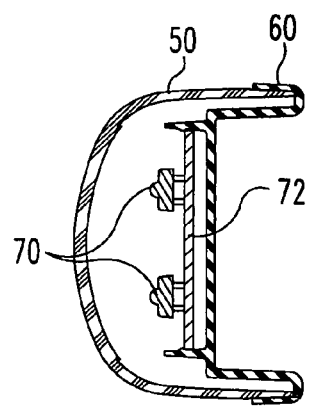
Fig. 3A  Fig. 3B  Fig. 3C
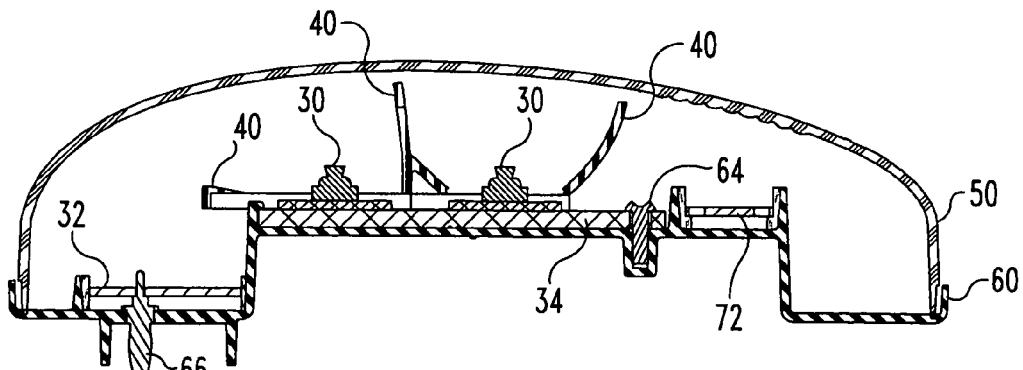
Fig. 4

INDICATOR APPARATUS AND METHOD FOR A VEHICLE USING SIDE-EMITTING LIGHT-EMITTING DIODE

This application is a continuation-in-part of prior U.S. application Ser. No. 10/815,595, filed Apr. 1, 2004, now abandoned the entirety of which is hereby incorporated herein by reference. This application is related to U.S. application Ser. No. 29/202,632, filed Apr. 1, 2004, now U.S. Pat. No. D500,153, the entirety of which is hereby incorporated herein by reference.

FIELD OF THE INVENTION

This invention relates generally to a vehicle indicator and more particularly to an apparatus and method for indicating the state of a vehicle utilizing side-emitting light-emitting diodes.

BACKGROUND OF THE INVENTION

Typically, regulations and guidelines for vehicle indicators require minimum light intensity patterns, as measured at various locations around the vehicle indicator to ensure the indicator is visible to other vehicle operators. Advantages may also be realized when light emanating from the vehicle indicator is directed toward the vehicle operator. Incandescent lamps are commonly utilized for vehicle indicators when broad photometric patterns are desired to comply with regulations or other particular design requirements. However, incandescent lamps are susceptible to vibration damage, have a bright filament spot that is not aesthetically desirable, generate large amounts of heat, and emit light over a broad spectrum including frequencies not desirable for certain applications. Typically, light emitting diodes are less susceptible to vibration damage, emit uniform intensity light that is more aesthetically desirable, generate less heat, and are capable of emitting light over a narrower spectrum than incandescent lamps. However, light emitting diodes do not generally emit light in the broad photometric patterns that are required for certain vehicle indicator applications, which may include directing at least a portion of the light toward the vehicle operator, such as, for example, side-mounted turn signals.

A need exists for an improved vehicle indicator that meets photometric requirements, is aesthetically desirable, capable of emitting light over a relatively narrow frequency range, is resistant to vibration damage, reduces the amount of heat generated, minimizes power requirements over typical incandescent lamps, and directs at least a portion of the emitted light toward the driver. Certain features of the present invention address these and other needs and provide other important advantages. Some or all of these features may be present in the corresponding independent or dependent claims, but should not be construed to be a limitation unless expressly recited in a particular claim.

SUMMARY OF THE INVENTION

Embodiments of the present invention provide an indicator that is mountable to a vehicle. Embodiments and features provide for a vehicle indicator that is mountable to a vehicle and capable of indicating the vehicle's state. The vehicle's state includes the vehicle's present, intended, or future position, movement, speed, or acceleration, or any combination thereof. Embodiments of the present invention utilize side-emitting light-emitting diodes, which may be used in conjunction with reflectors, lenses and/or traditional light-emitting diodes.

It is an object of certain embodiments to provide a vehicle indicator with side-emitting light-emitting diodes.

It is an object of certain embodiments to provide a vehicle indicator with increased vibration durability.

It is an object of certain embodiments to provide a vehicle indicator that meets certain minimum photometric requirements.

It is an object of certain embodiments to provide a vehicle indicator that minimizes power requirements.

It is an object of certain embodiments to provide a vehicle indicator that emits light over a relatively narrow frequency range.

It is an object of certain embodiments to provide a vehicle indicator that emits light toward an observer, such as the vehicle operator or an operator of another vehicle.

Further objects, features and advantages of the embodiments of the present invention shall become apparent from the detailed drawings and descriptions provided herein.

BRIEF DESCRIPTION OF THE DRAWINGS

FIG. 2 is a top cut-away view of the embodiment shown in FIG. 1.

FIG. 3A is a cut-away view along line 3A—3A of FIG. 2.

FIG. 3B is a cut-away view along line 3B—3B of FIG. 2.

FIG. 3C is a cut-away view along line 3C—3C of FIG. 2.

FIG. 4 is a cut-away view along line 4—4 of FIG. 2.

DESCRIPTION OF THE SELECTED EMBODIMENTS

Figure 1:
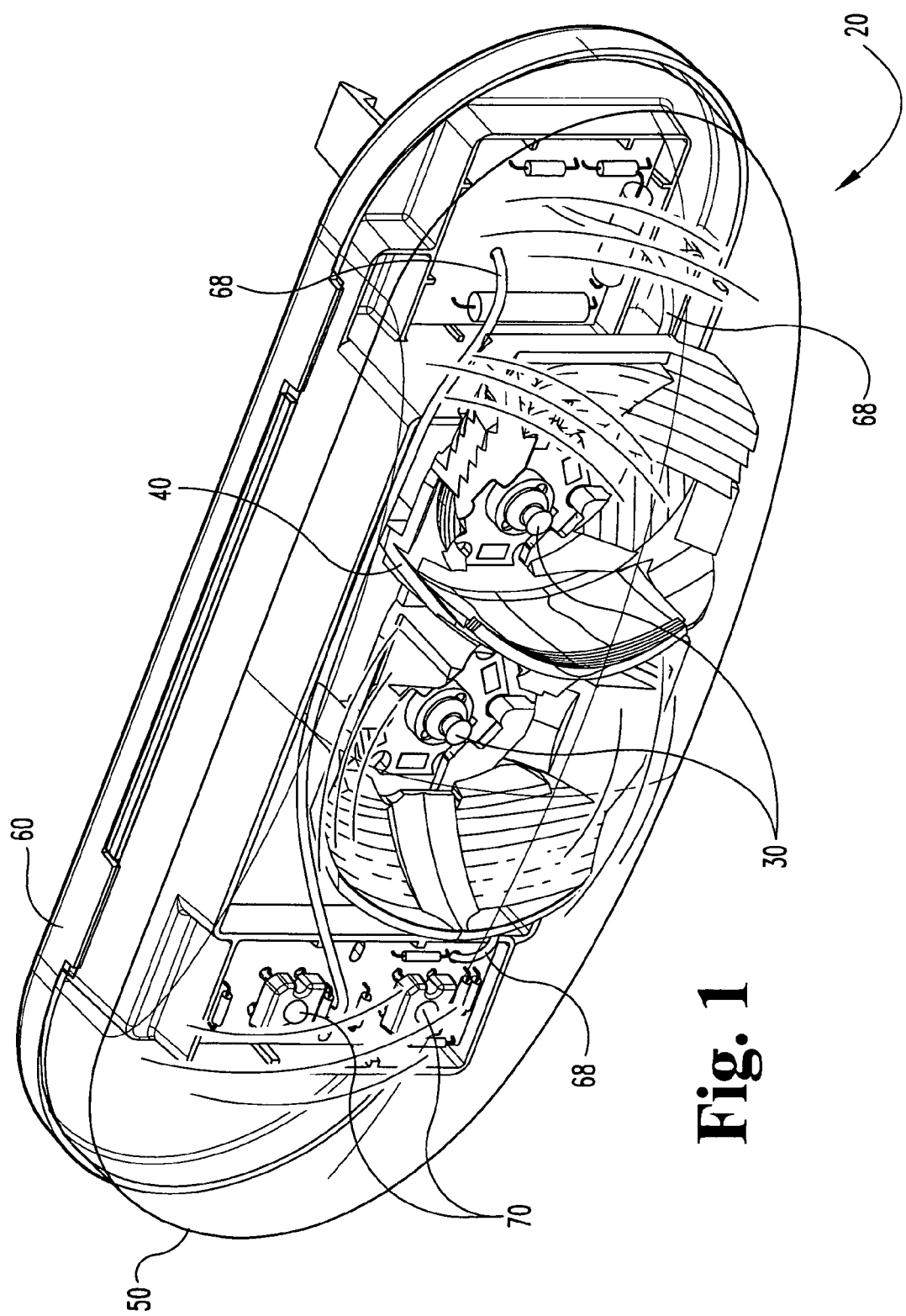
FIG. 1 is a perspective view of one embodiment of the present invention.

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

In certain embodiments, the present invention provides a vehicle indicator with side-emitting light-emitting diodes. The side-emitting light-emitting diodes provide vibration resistance, power consumption, heat generation, aesthetic, and spectral transmission advantages over traditional incandescent lamps. One example embodiment includes a side-mounted automobile turn signal indicator. The present invention may be mounted on any vehicle or structure for transporting persons or things, such as powered, unpowered, guided, unguided, manned or unmanned vehicles. Example vehicles include, but are not limited to, automobiles, aircraft, spacecraft, watercraft, trailers, semitrailers, sleds, buggies, and carts. The vehicles are typically operated in proximity to other vehicles with the indicators serving to indicate the vehicle's present, intended, or future position, movement, speed, or acceleration, or any combination thereof. Typically, the vehicle indicators are mounted to the exterior of a vehicle.

A vehicle indicator 20 according to one embodiment of the present invention is illustrated in FIGS. 1–6. The vehicle indicator 20 is comprised of cover 50 and base 60. Vehicle indicator 20 further includes side-emitting light-emitting diodes 30, electrical wires 68, light-emitting diodes 70, and a light directing element, such as reflector 40. Cover 50 is attached to base 60 and encloses reflector 40, side-emitting light-emitting diodes 30, light-emitting diodes 70, and all associated circuitry and hardware. Base 60 is connected to vehicle 80 (FIG. 6) utilizing a rubber grommet, although other embodiments do not use a rubber grommet. Vehicle mounting clip 62 is used to assist in attaching electrical terminals 66 to an electrical wiring connector in the vehicle's wiring harness.

Side-emitting light-emitting diodes 30 are thermally connected to heat sink 34 and are electrically connected to electrical wires 68, which are connected to circuit board 32. Circuit board 32 is electrically connected to electrical terminals 66.

Light-emitting diodes 70 are electrically connected to circuit board 72. Circuit board 72 is electrically connected to electrical wires 68, which are electrically connected to electrical terminals 66.

Electrical terminals 66 are electrically connected to corresponding electrical connectors located on the vehicle's structure (not depicted), which are electrically connected to the power source (not depicted), frequently the vehicle's main power source.

Figure 5:
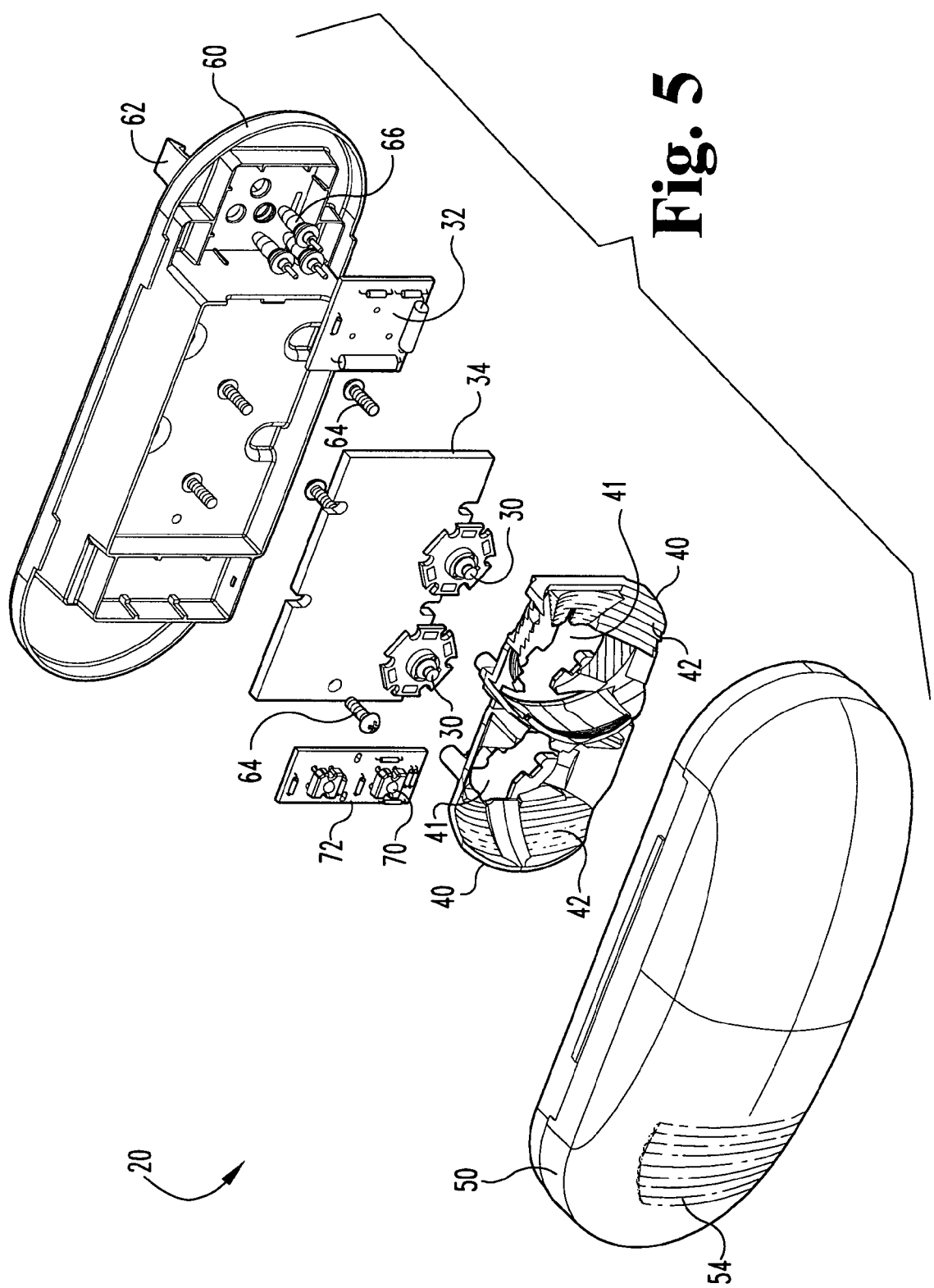
FIG. 5 is an exploded perspective view of the embodiment shown in FIG. 1.

Heat sink 34 is connected to base 60 by attachment hardware 64 (FIG. 5). Heat sink 34 dissipates heat generated by side-emitting light-emitting diodes 30. Reflector 40 is connected to heat sink 34 by attachment hardware 64. When reflector 40 and heat sink 34 are connected, side-emitting light-emitting diodes 30 extend through openings 41 in reflector 40.

In certain embodiments, reflector 40 is a complex reflector containing multifaceted surfaces 42. Multifaceted surfaces 42 each contain a variety of smaller surfaces for reflecting light. The smaller surfaces may have various shapes, such as by way of nonlimiting example, planar, conical, angular, and irregular. The multifaceted surfaces 42 are capable of reflecting light in directions difficult to achieve with smooth surfaces alone. However, other embodiments utilize smooth surfaced reflectors and combinations of smooth and faceted surfaces. Yet other embodiments utilize reflectors with lens portions that allow light to pass through.

A bonding substance, such as a resin or epoxy (not depicted), is used to encase circuit boards 32 and 72, and to encase portions of side-emitting light-emitting diodes 30 with heat sink 34. The bonding substance helps to electrically insulate the circuitry, dissipate heat, and increase the durability of the vehicle indicator 20, especially with respect to vibration. The bonding substance is further useful in protecting the circuitry from damage from objects penetrating cover 50.

The electrical power from the vehicle enters the vehicle indicator 20 through electrical terminals 66. Circuit boards 32 and 72 are electrically connected to electrical terminals 66 and may modify the electrical power to conform with the power requirements of side-emitting light-emitting diodes 30 and light-emitting diodes 70, respectively. Light-emitting diodes 70 are more "conventional" light-emitting diodes and primarily emit light radially over a portion of the hemisphere located above light-emitting diode 70. Light-emitting diodes 70 receive power from circuit board 72. Side-emitting light-emitting diodes 30 receive power from circuit board 32 and emit light in a predominantly planar fashion. In the depicted embodiment, the central plane of emission for side-emitting light-emitting diodes 30 passes through diodes 30 and is approximately parallel to heat sink 34. Reflector 40 reflects the light emanating from side-emitting light-emitting diodes 30 and focuses the light into the desired directions.

Cover 50 functions to protect the indicator assembly from weather or travel related damage. Cover 50 can also function to influence the indicator's photometric pattern, and/or affect the frequency of light emanating from indicator 20. The portion of cover 50 surrounding reflector 40 allows light emitting from side-emitting light-emitting diodes 30 and reflector 40 to pass through cover 50 relatively unaltered in direction. In contrast, the portion of cover 50 in proximity to light-emitting diodes 70 contains cover lenses 54 (FIG. 5). Cover lenses 54 alters the direction of light emanating from light-emitting diodes 70 and focuses the light into desired directions.

Other embodiments of cover 50 contain portions where the cover is textured, for example, frosted, in order to diffusively scatter light emanating from the vehicle indicator 20. Cover 50 may be transparent to the visual or non-visual spectrums and may act as a filter to allow only certain wavelengths to pass through the cover 50. Example visual spectrum wavelengths at which cover 50 may allow light to pass through are red, green, yellow, blue and white. Example non-visible spectrum wavelengths are in the infrared and ultraviolet regions.

Figure 6:
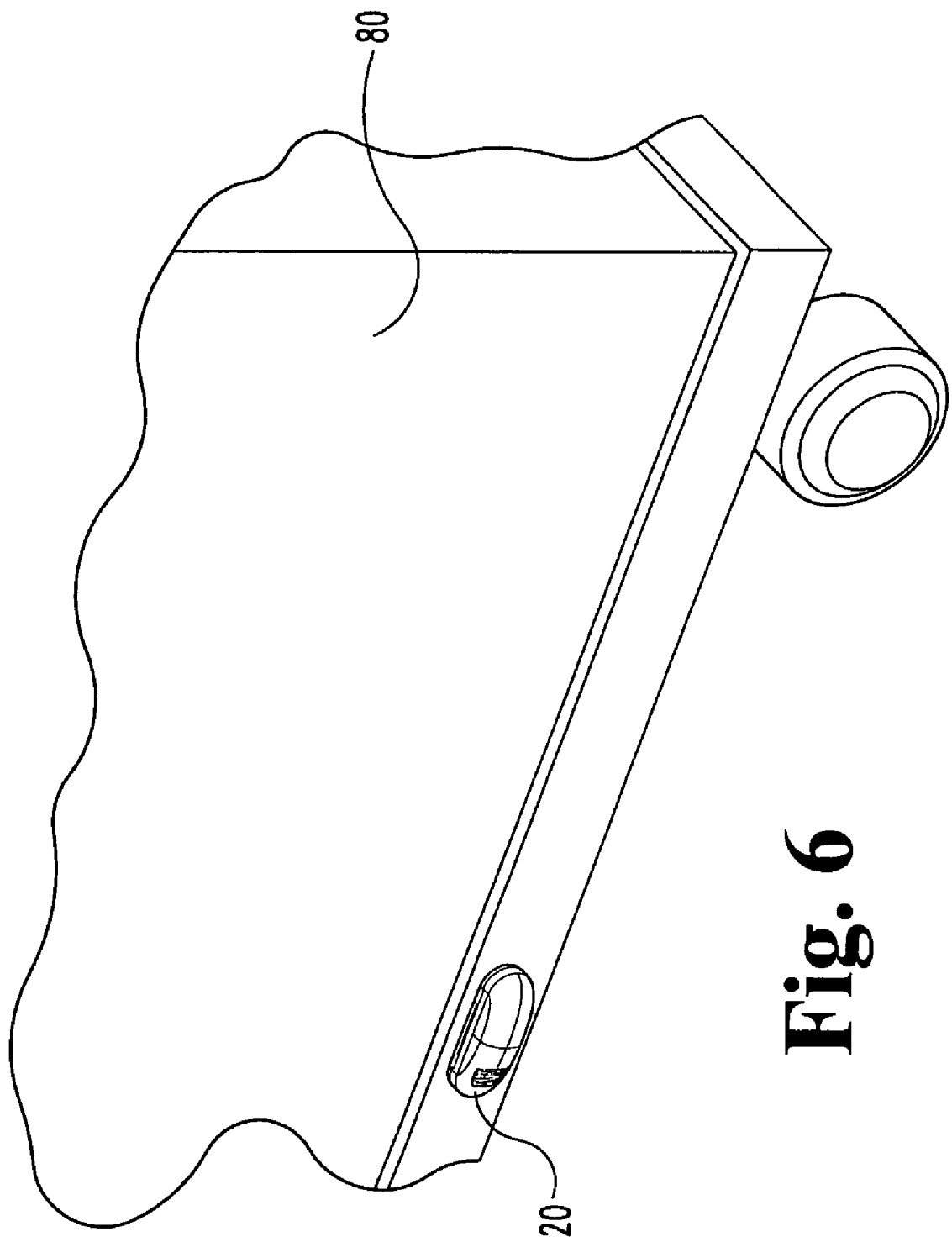
FIG. 6 is a cut-away perspective view of the embodiment shown in FIG. 1 mounted to a semitrailer vehicle.
Figure 7:
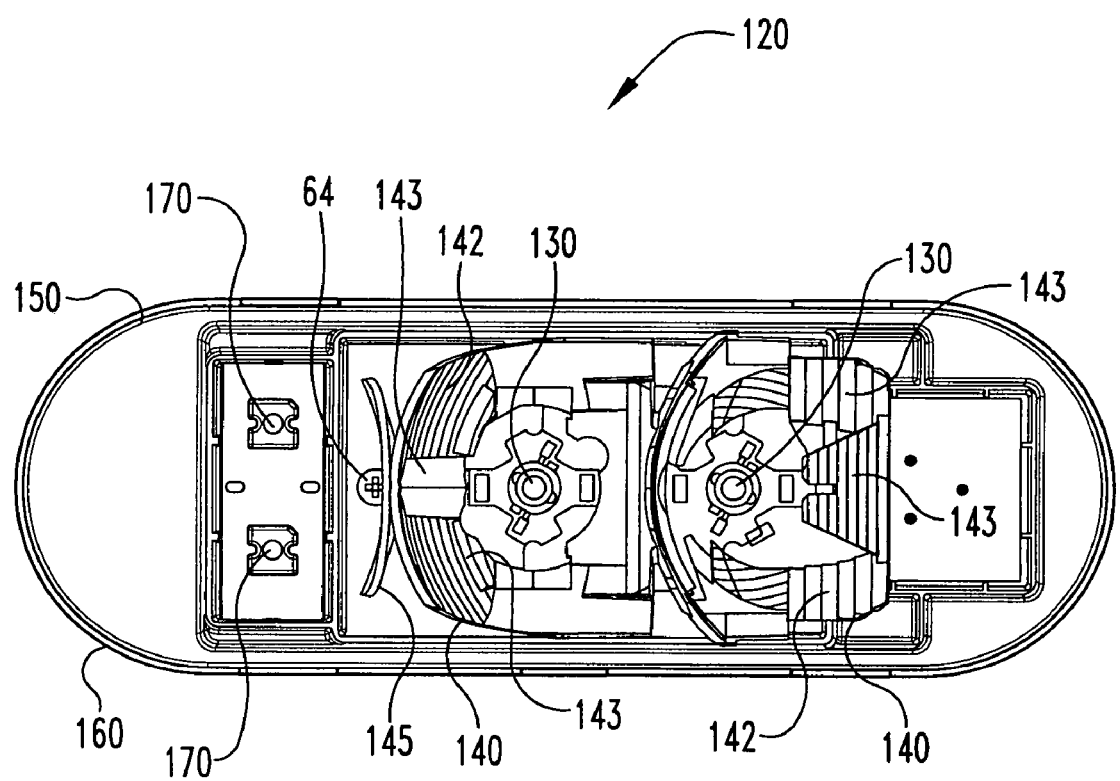
FIG. 7 is a top cut-away view of another embodiment of the present invention.
Figure 8:
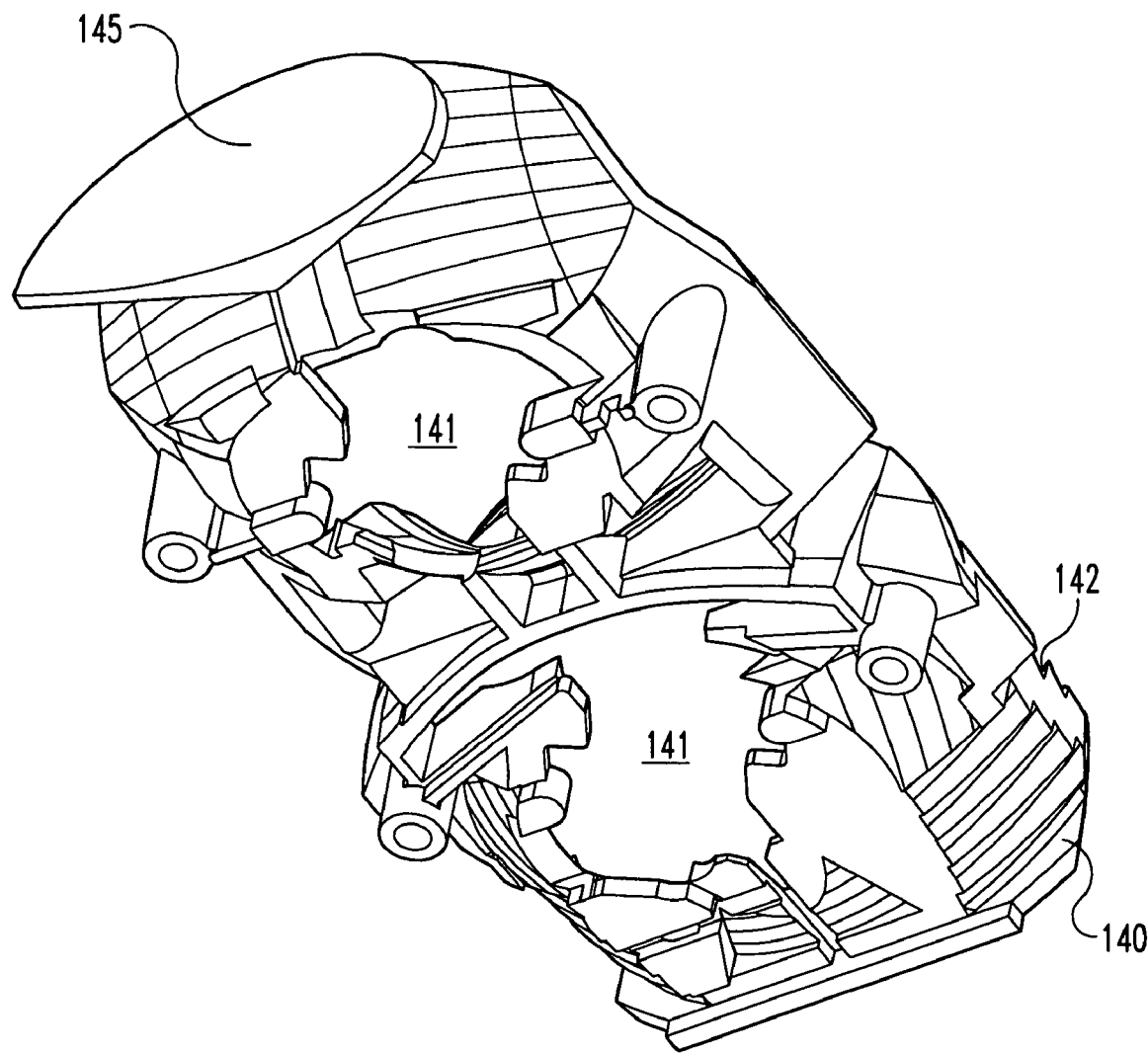
FIG. 8 is a perspective view of the light directing element shown in FIG. 7.
Figure 9:
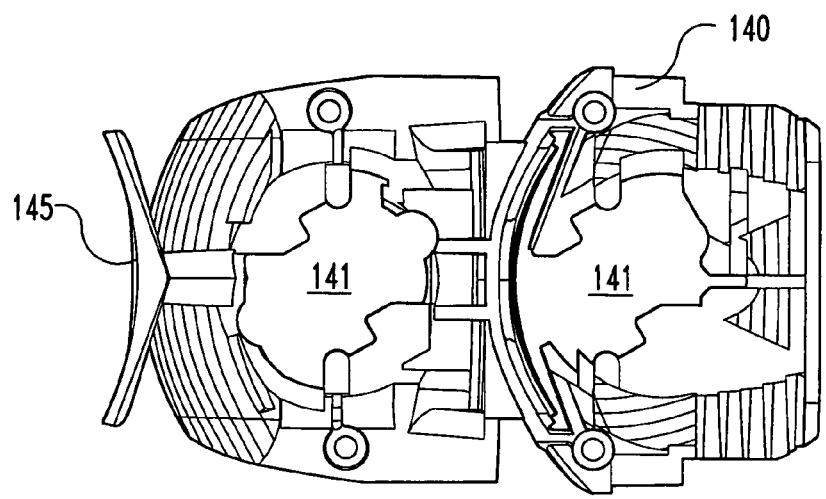
FIG. 9 is a bottom elevational view of the light directing element shown in FIG. 7.
Figure 10:
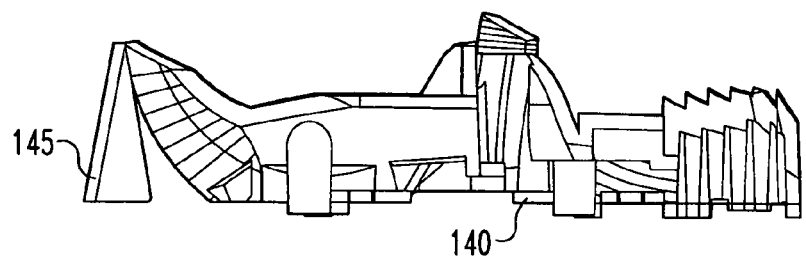
FIG. 10 is a side elevational view of the light directing element shown in FIG. 7.
Figure 11:
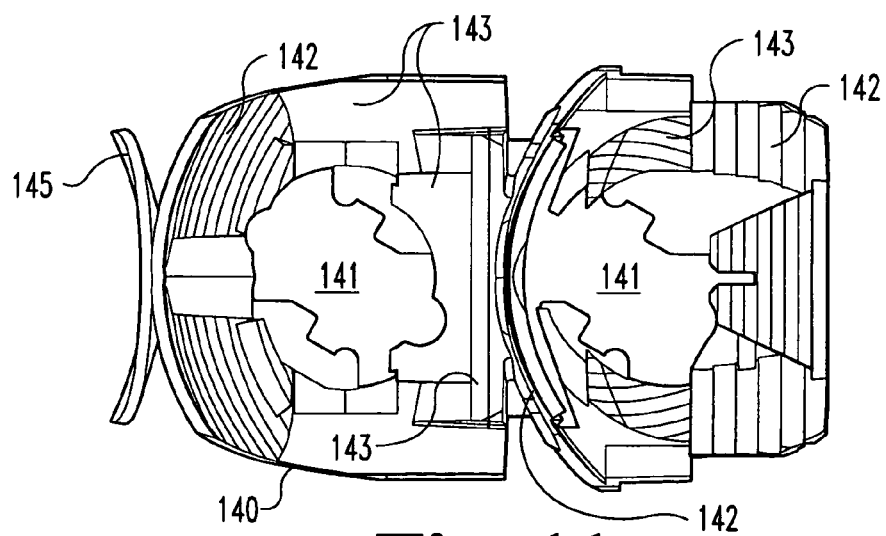
FIG. 11 is a top elevational view of the light directing element shown in FIG. 7.

One example embodiment of the present invention is a side turn signal indicator that is mounted to a truck trailer (FIG. 6). The side turn signal is placed on the side of the trailer, near the mid-point between the front and rear of the trailer. This position allows observers, such as operators of other vehicles, to see the side turn signal from positions where they cannot see either the front or rear turn signals of the trailer and/or truck.

In use, the truck's operator actuates a turn signal generating device when a change of direction is desired. A timing circuit, either in the turn signal device or the vehicle indicator, varies the amount of electrical power received by vehicle indicator 20, typically in a repeating fashion. Circuit board 32 and circuit board 72 receive these power variations and, as a result, vary the power transmitted to side-emitting light-emitting diodes 30 and light-emitting diodes 70. The power variations result in variations in the light intensity emitted from side-emitting light-emitting diodes 30 and light-emitting diodes 70. In one embodiment, the power variations result in side-emitting light-emitting diodes 30 and light-emitting diodes 70 alternatively illuminating and extinguishing in a repeating fashion. The flashing of vehicle indicator 20 signals to operators of other nearby vehicles that the vehicle's operator intends to turn the vehicle. In other embodiments, circuit board 32 and/or circuit board 72 include timing circuitry to vary the intensity of side-emitting light-emitting diodes 30 and light-emitting diodes 70.

In an alternate embodiment, the variations in power received by vehicle indicator 20 result in side-emitting light-emitting diodes 30 and light-emitting diodes 70 alternating between bright and dim intensity levels. In this situation, the vehicle indicator is continually emitting light; however, the light flashes between a high and low intensity similarly indicating the operator's intention to turn the trailer. This configuration is particularly useful at night when it is advantageous to have side-emitting light-emitting diodes 30 and light-emitting diodes 70 continually emitting light at a minimum level. Certain other embodiments utilize side-emitting light-emitting diodes 30 and light-emitting diodes 70 that are capable of emitting light at a continuous range of intensity levels.

Side-emitting light-emitting diodes 30 and light-emitting diodes 70 may transmit light in the visible and/or non-visible spectrum. Common visible spectrum colors in which the side-emitting light-emitting diodes 30 and light-emitting diodes 70 may transmit are red, green, yellow, blue and white. Typical non-visible spectrum regions in which side-emitting light-emitting diodes 30 and light-emitting diodes 70 may transmit are in the infrared and ultraviolet wavelengths. Emitting light in primarily non-visible spectrums may be particularly useful for certain military applications.

In many instances, vehicle indicators are required to meet particular requirements in order to comply with governmental or private regulations. Nonlimiting example specifications required for side turn indicators for vehicles include The Society for Automotive Engineers ("SAE") Standard J914, November 1987, SAE Standard J2039, June 1994, and SAE Standard J2039, May 2001. These example specifications require a broad photometric pattern that requires a minimum intensity of light to be emitted over multiple steradians. The SAE J2039, June 1994, standard requires minimum intensity levels at test points ranging from between five degrees from the vehicle's front to five degrees from the vehicle's rear in the horizontal plane, and from fifty degrees up to twenty degrees down in the vertical plane. The SAE J914, November 1987, standard requires minimum intensity levels at test points ranging from between 90 degrees from the vehicle's front to five degrees from the vehicle's rear in the horizontal plane, and from fifteen degrees up to fifteen degrees down in the vertical plane. Other specifications may require different test points and/or minimum intensity levels. The combination of side-emitting light-emitting diodes 30, light-emitting diodes 70, and reflector 40 allow the vehicle indicator 20 to meet the requirements of these example specifications as well as other specifications.

Various types of power sources may be utilized with vehicle indicator 20, such as either AC or DC current. However, conversion to DC power is frequently required for side-emitting light-emitting diodes 30. Example power sources are dry or wet cell batteries, rechargeable batteries, solar cells, or generators. The power may be derived from the vehicle's main power supply system or may be derived from the indicator's own power source.

Materials preferable for constructing the indicator are those which possess vibration, weather and impact resistance. Cover 50 and reflector 40 are typically constructed of material that does not readily change its optical properties (transmissivity or reflectivity) under typical weather conditions such as sunlight, rain or snow. Reflector 40 may be constructed of any reflective material, such as plastic or metal. Cover 50 may be constructed of any material with appropriate optical transmission characteristics such as plastic or glass; however, plastic material less susceptible to shattering than glass is frequently preferred. Base 60 is constructed of any sufficiently durable material, such as plastic, metal or composite material. The material utilized for constructing circuit boards 32 and 72 is typical of standard circuit boards, and common electrical devices, such as capacitors, resistors and transistors and means of connecting them, such as soldering, are typically utilized.

A vehicle indicator 120 according to another embodiment of the present invention is illustrated in FIGS. 7 through 11. The example embodiment vehicle indicator 120 is similar to the example embodiment vehicle indicator 20 with example differences being described herewith. The vehicle indicator 120 directs light toward observers, which include the operator of the vehicle to which indicator 120 is attached and operators of other vehicles, by way of non-limiting examples. Vehicle indicator 120 is comprised of cover 150 and base 160. Vehicle indicator 120 further includes side-emitting light-emitting diodes 130, light-emitting diodes 170, and light directing element 140. Cover 150 is attached to base 160 and encloses light directing element 140, side-emitting light-emitting diodes 130, and light-emitting diodes 170.

In the depicted embodiment, light directing element 140 is a complex reflector containing multifaceted surfaces 142. Multifaceted surfaces 142 each comprise a variety of smaller surfaces 143 for reflecting light. Each multifaceted surface 142 has an overall geometric shape that may differ from other multifaceted surfaces 142. Example overall shapes for each multifaceted surface 142 include, by way of nonlimiting example, planar, conical (including conic sections), angular, cylindrical (including cylindrical sections), irregular, and freeform. Each smaller surface 143 has a shape that may differ from the shape of other smaller surfaces 143, and may differ from the overall shape of the multifaceted surface 142 of which each smaller surface 143 is a part. Example shapes for each smaller surface 143 include, by way of nonlimiting example, planar, conical (including conic sections), angular, cylindrical (including cylindrical sections), irregular, and freeform. The multifaceted surfaces 142 are capable of reflecting light in directions difficult to achieve with smooth surfaces alone. Other embodiments utilize different means for directing or scattering light, such as smooth surface reflectors, combination smooth and faceted surface reflectors, prisms, fiber optics, and textured lenses or coverings, by way of nonlimiting example.

Light directing element 140 further comprises light director 145. Light director 145 is a reflector and reflects a portion of the light emitted from light emitting diodes 170 toward an observer forward of vehicle indicator 120, such as toward the vehicle operator. The observer may observe the light reflected by light director 145 either directly, or indirectly after reflecting off another object. Examples of indirect observation include the light from vehicle indicator 120 reflecting through the vehicle operator's rear view mirror or scattering off water vapor particles in the air prior to entering the observer's eye.

The light reflected from light director 145 toward the vehicle operator provides the vehicle operator with a direct indication of whether vehicle indicator 120 is properly operating. For example, when vehicle indicator 120 is utilized as a turn signal, the vehicle operator is able to determine if vehicle indicator 120 is blinking by observing, at least in part, the light from light-emitting diodes 170 reflected by light director 145. This aspect of the invention provides the vehicle operator with an independent verification of vehicle indicator 120's operational status independent of the turn signal indicator typically located on the vehicle's dashboard, and is particularly beneficial when the dashboard turn signal indicator malfunctions.

Light director 145 utilizes a smooth curved reflective surface to reflect light from light-emitting diode 170. In the depicted embodiment, the overall shape of light director 145's reflective surface is parabolic. In other embodiments, light director 145's reflective surface has other shapes, such as by way of nonlimiting example, planar, conical (including conic sections), angular, elliptical, cylindrical (including cylindrical sections), irregular, and freeform. In other embodiments, light director 145 utilizes multifaceted surface reflectors similar to those described above. Still other embodiments of light director 145 utilize different means for directing or scattering light, such as combination smooth and faceted reflectors, prisms, fiber optics, and textured coverings or lenses, by way of nonlimiting example. In still further embodiments, light emitting diode 170 is mounted on a surface approximately normal to the side of the vehicle with light emanating from the light emitting diode in a forward direction along the side of the vehicle and into an exterior rearview-mirror of the vehicle.

Light directing element 120 complies with various photometric pattern requirements, such as SAE Standard J914, November 1987, SAE Standard J2039, June 1994, and SAE Standard J2039, May 2001 as described above. Other embodiments may not comply with these requirements or may comply with other requirements.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A vehicle indicator mountable on a generally vertical part of a vehicle, comprising:
    a side-emitting first light-emitting diode that emits light predominantly in a plane, said plane being generally vertical with respect to the vehicle;
    at least one first reflector next to said side-emitting first light-emitting diode and within said generally vertical plane to reflect light emanating from said side-emitting first light-emitting diode when illuminated, said at least one first reflector including a generally spherically shaped reflective portion; and
    at least one second reflector located across said side-emitting first light-emitting diode from said at least one first reflector, said at least one second reflector being multifaceted and curved in a stepped-bowl shape.

2. The vehicle indicator of claim 1, wherein said at least one first reflector reflects said generally vertical plane of light into a generally horizontal photometric pattern of light away from the vehicle.

3. The vehicle indicator of claim 2, wherein said generally horizontal photometric pattern provides vehicular indication lighting with a minimum of 20 candela and a maximum of 300 candela at a distance of at least 3 meters from the vehicle indicator and at locations between at least: (1) plus 15 degrees and minus 15 degrees, vertically; and, (2) 90 degrees from the vehicle's front and 5 degrees from the vehicle's rear.

4. The vehicle indicator of claim 2, wherein said generally horizontal photometric pattern provides vehicular indication lighting with a minimum of 12 candela and a maximum of 200 candela at a distance of at least 3 meters from the vehicle indicator and at locations between at least: (1) plus 50 degrees and minus 20 degrees, vertically; and, (2) 5 degrees from the vehicle's front and 5 degrees from the vehicle's rear.

5. The vehicle indicator of claim 1 and further comprising a second light emitting diode, said second light emitting diode being illuminated generally concurrently with said first light emitting diode, wherein light from said second light emitting diode emanates in a forward direction along the side of the vehicle and into an exterior rearview-mirror of the vehicle.

6. The vehicle indicator of claim 5, wherein said light emitting diodes flash as turn signal indicators.

7. The vehicle indicator of claim 5 and further comprising at least one third reflector for reflecting light from said second light emitting diode forwardly toward the outside rear-view mirror of the vehicle.

8. The vehicle indicator of claim 7, wherein said at least one third reflector is located between said second light emitting diode and said side-emitting first light emitting diode.

9. The vehicle indicator of claim 7, wherein said at least one first reflector includes a multifaceted reflective surface for reflecting light, and wherein said at least one third reflector includes a smooth reflective surface for reflecting light forwardly toward the outside rear-view mirror of the vehicle.

10. The vehicle indicator of claim 5 and further comprising a light-transmissive cover over said light emitting diodes, wherein said cover comprises at least one lens for directing light forwardly toward the outside rear-view mirror of the vehicle.

11. The vehicle indicator of claim 10, further comprising a light-transmissive cover, wherein said cover is primarily transmissive in the yellow visible electromagnetic spectrum.

12. The vehicle indicator of claim 1, further comprising electronic circuitry, wherein said circuitry provides alternating illumination intensity levels of said side-emitting first light-emitting diode.

13. A vehicle indicator mountable on a generally vertical part of a vehicle, comprising:
    a side-emitting first light-emitting diode that emits light predominantly in a plane, said plane being generally vertical with respect to the vehicle; and
    means for directing light from said side-emitting first light-emitting diode when illuminated, said means for directing light including a generally spherical reflector located beside said side-emitting first light-emitting diode and a curved multifaceted reflector located across said side-emitting first light-emitting diode from said generally spherical reflector.

14. The vehicle indicator of claim 13, wherein said means for directing light is adapted to direct said generally vertical plane of light into a generally horizontal photometric pattern of light away from the Vehicle.

15. The vehicle indicator of claim 14, wherein said generally horizontal photometric pattern provides vehicular indication lighting with a minimum of 20 candela and a maximum of 300 candela at a distance of at least 3 meters from the vehicle indicator and at locations between at least: (1) plus 15 degrees and minus 15 degrees, vertically; and, (2) 90 degrees from the vehicle's front and 5 degrees from the vehicle's rear.

16. The vehicle indicator of claim 14, wherein said generally horizontal photometric pattern provides vehicular indication lighting with a minimum of 12 candela and a maximum of 200 candela at a distance of at least 3 meters from the vehicle indicator and at locations between at least:

(1) plus 50 degrees and minus 20 degrees, vertically; and, (2) 5 degrees from the vehicle's front and 5 degrees from the vehicle's rear.

17. The vehicle indicator of claim 13 and further comprising a second light emitting diode, said second light emitting diode being illuminated generally concurrently with said first light emitting diode, wherein light from said second light emitting diode emanates in a forward direction along the side of the vehicle and into an exterior rearview-mirror of the vehicle.

18. The vehicle indicator of claim 17, Wherein said light emitting diodes flash as turn signal indicators.

19. The vehicle indicator of claim 17 and further comprising a means for directing light from said second light-emitting diode forwardly toward the outside rear-view mirror of the vehicle.

20. The vehicle indicator of claim 19, wherein said means for directing light from said second light-emitting diode is located between said second light emitting diode and said side-emitting first light emitting diode.

21. The vehicle indicator of claim 19 and further comprising a light-transmissive cover over said light emitting diodes, wherein said means for directing light from said second light-emitting diode comprises at least one lens on said cover for reflecting light forwardly toward the outside rear-view mirror of the vehicle.

22. The vehicle indicator of claim 19, wherein said means for directing light from said second light-emitting diode includes a reflector.

23. The vehicle indicator of claim 19, wherein said generally spherical reflector is multifaceted, and wherein said means for directing light from said second light-emitting diode includes at least one smooth reflector for reflecting light forwardly toward the outside rear-view mirror of the vehicle.

24. The vehicle indicator of claim 13, further comprising a light-transmissive cover, wherein said cover is primarily transmissive in the yellow visible electromagnetic spectrum.

25. The vehicle indicator of claim 13, further comprising electronic circuitry, wherein said circuitry provides alternating illumination intensity levels of said side-emitting first light-emitting diode.

26. A vehicle indicator mountable on a generally vertical part of a vehicle, comprising:
   a first side-emitting first light-emitting diode;
   a first reflector segment located beside said first light-emitting diode, said first reflector segment being generally spherical in shape; and
   a second reflector segment located across said first side-emitting first light-emitting diode from said first reflector segment, said second reflector segment being curved in shape and having a central axis of the curve that is generally horizontal and oriented parallel to the forward direction of the vehicle.

27. The vehicle indicator of claim 26 and further comprising:
   a second side-emitting first light-emitting diode;
   a third reflector segment located beside said second light emitting diode, said third reflector segment being generally cylindrical in shape; and
   a fourth reflector segment located across said second side-emitting first light-emitting diode from said third reflector segment, said fourth reflector segment being curved in shape and having a central axis of the curve that is generally horizontal and oriented parallel to the forward direction of the vehicle.

28. The vehicle indicator of claim 27 wherein said generally photometric pattern provides vehicular indication lighting with a minimum of 12 candela and a maximum of 200 candela at a distance of at least 3 meters from the vehicle indicator and at locations between at least: (1) plus 50 degrees and minus 20 degrees, vertically; and, (2) 5 degrees from the vehicle's front and 5 degrees from the vehicle's rear.

29. The vehicle indicator of claim 26 and further comprising a third light emitting diode, wherein light from said third light emitting diode emanates in a forward direction along the side of the vehicle and into an exterior rearview-mirror of the vehicle.

30. The vehicle indicator of claim 29 wherein said light emitting diodes flash as turn signal indicators.

31. The vehicle indicator of claim 29 and further comprising a forward reflector for reflecting light from said third light emitting diode forwardly toward the outside rear-view mirror of the vehicles.

32. The vehicle indicator of claim 31, wherein said first reflector includes a multifaceted reflective surface for reflecting light, and wherein said forward reflector includes a smooth reflective surface for reflecting light forwardly toward the outside rear-view mirror of the vehicle.

33. The vehicle indicator of claim 31, further comprising a light-transmissive cover, wherein said cover is primarily transmissive in the yellow visible electromagnetic spectrum.

34. The vehicle indicator of claim 31, further comprising electronic circuitry, wherein said circuitry provides alternating illumination intensity levels of said light-emitting diodes.

35. The vehicle indicator of claim 26, wherein said generally horizontal photometric pattern provides vehicular indication lighting with a minimum of 20 candela and a maximum of 300 candela at a distance of at least 3 meters from the vehicle indicator and at locations between at least: (1) plus 15 degrees and minus 15 degrees, vertically; and, (2) 90 degrees from the vehicle's front and 5 degrees from the vehicle's rear.

* * * * *

UNITED STATES PATENT AND TRADEMARK OFFICE
CERTIFICATE OF CORRECTION

PATENT NO. : 7,245,203 B2
APPLICATION NO. : 11/064395
DATED : July 17, 2007
INVENTOR(S) : Stephens and Williams It is certified that error appears in the above-identified patent and that said Letters Patent is hereby corrected as shown below:

In column 8, line 54, please change "Vehicle" to --vehicle--

In column 9, line 11, please change "Wherein" to --wherein--

In column 10, line 31, please change "vehicles" to --vehicle--

Signed and Sealed this

Eighth Day of April, 2008

JON W. DUDAS
*Director of the United States Patent and Trademark Office*